United States Patent [19]

Thorngren

[11] Patent Number: 5,239,203
[45] Date of Patent: Aug. 24, 1993

[54] COMMON GROUND CONTROL SWITCH FOR AN IRRIGATION SYSTEM

[75] Inventor: John T. Thorngren, Dallas, Tex.

[73] Assignee: Texand Corporation, Lake Dallas, Tex.

[21] Appl. No.: 639,013

[22] Filed: Jan. 9, 1991

Related U.S. Application Data

[63] Continuation-in-part of Ser. No. 503,467, Mar. 30, 1990.

[51] Int. Cl.$^5$ .............................................. A01G 25/00
[52] U.S. Cl. .................................. 307/116; 307/118; 340/514
[58] Field of Search ............... 307/112, 118, 632, 308, 307/116; 361/170, 178–181; 340/514, 315, 602, 603, 620, 612, 616; 323/245, 320–326

[56] References Cited

U.S. PATENT DOCUMENTS

4,224,606 9/1980 Bartles ............................. 340/514
4,875,498 8/1989 Andrews et al. .................. 187/78.3

Primary Examiner—A. D. Pellinen
Assistant Examiner—Aditya Krishnan
Attorney, Agent, or Firm—Johnson & Gibbs

[57] ABSTRACT

A control switch for controlling the operation of an overhead irrigation system based upon the moisture level of the ground in an area to be irrigated. The control switch includes first and second moisture detection probes positioned at first and second underground locations in the area to be irrigated, which, upon detection that the soil is dry, place a positive conductive charge on the switch, thereby turning on the irrigation equipment. Upon detection that the soil is wet, the probes remove the conductive charge, thereby turning off the irrigation equipment. The control switch provides varying degrees of sensitivity to soil moisture, and varying time delays in turning the switch on when the soil is dry, and in turning the switch off when the soil is wet. A pulsing current protection circuit permits a positive DC signal taken from an AC triac to turn on the triac when both the AC and DC portions of the control switch share a common ground.

4 Claims, 6 Drawing Sheets

COMMON GROUND CONTROL SWITCH FOR AN IRRIGATION SYSTEM

CROSS REFERENCE TO RELATED APPLICATION

This application is a continuation-in-part of co-pending U.S. patent application Ser. No. 07/503,467, filed Mar. 30, 1990, assigned to the assignee of the present invention, and hereby incorporated by reference as if reproduced in its entirety.

BACKGROUND OF THE INVENTION

1. Field of the Invention

This invention is related to a common ground control circuit for an irrigation system and, more specifically, to a common ground control switch for an irrigation system which controls the operation of electrically operated irrigation equipment associated therewith based upon the level of moisture in the ground.

2. Description of Related Art

Irrigation systems may be classified by the source of water and the manner in which water is distributed to the land. In terms of distributing irrigation water, there are four basic methods: (1) flood irrigation, (2) furrow irrigation, (3) subirrigation system and (4) overhead irrigation system. An overhead irrigation system artificially distributes water over the ground. Such systems mimic natural rain conditions by spraying the water over fields, lawns or other designated areas of land. One such overhead irrigation system is commonly referred to as a sprinkler system. Sprinkler systems, which may be of either the portable, semi-permanent, or permanent variety depending on whether the lateral pipeline (including the sprinkler), main pipeline, and pumping plant are moveable or fixed, typically operate by the piping of water under pressure through a sprinkler or perforations or nozzles in a pipeline, thus forming a spray. For land which surrounds private residences, the use of permanent-type overhead irrigation systems having fixed sprinklers are common. As previously mentioned, however, such sprinkler systems merely mimic natural rain conditions and, as will be described below, will often produce advese effects very similar to those traditionally caused by natural rain conditions.

A typical prior art control system for a permanently installed sprinkler system consists of a cycle timer in combination with a solenoid valve which consists of a solenoid coil and a metal stem. The cycle timer turns the solenoid valve on for a specified period of time, thereby permitting a sprinkler associated with the solenoid valve to disperse water supplied by a connected pipeline. To disperse water, the solenoid coil actuates the metal step which pushes or pulls on a diaphragm operating the valve. Often, the cycle timer is set well in advance of the period during which water is dispersed and the sprinkler system turned on during periods when the lawn is not in use. For example, a cycle timer may be set such that the associated sprinkler will water the lawn for one-half hour every morning. The drawback to such systems is that once set, the sprinkler system will provide the same amount of water irregardless of either the immediate weather conditions or the seasonal weather conditions. Such systems provide no control of the amount of water distributed to the ground based upon the moisture content of the ground being irrigated is provided. Thus, the control system will actuate the sprinkler to disperse water even if the ground is already sufficiently moist if the cyclee timer associated therewith is issuing the appropriate instruction. As a result, to prevent the distribution of water during a rainstorm, or to limit the amount of water dispersed to sufficiently moistened soil during a rainy season, the cycle time must be manually overridden.

There exists numerous control switches which are intended to control the operation of an electrical system associated therewith. For example, in my co-pending U.S. patent application Ser. No. 07/503,467, filed Mar. 30, 1990, I disclosed various embodiments of a two probe control switch for disconnecting an associated electrical system comprised of an AC source and a load upon the detection by the probes of an excessive liquid accumulation at a specified location. The various embodiments of the aforementioned control switch may be seen by reference to FIGS. 3b, 4a-b, 5a-b and 6a-d and the operation of each of these control switches is described in detail below. While the operation of the disclosed control switches has been generally satisfactory, accidental electrical contact between the probes and the associated electrical system may result in damage to the electrical system.

Referring momentarily to the control switch 48 illustrated in FIG. 3b, this problem will now be described in greater detail. If the first liquid detection probe 54 accidentally contacts AC line Am the rectifier diode DD2 is bypassed and a half wave or pulsing DC current can flow through the rectifier diode DD1 to the load 52. Similarly, if the first liquid detection probe 54 contacts AC line B, the rectifier diode DD1 is bypassed and pulsing DC current can flow through the rectifier DD2 to the load 52. Similar bypasses of the rectifier diodes DD1 and DD2 and resultant pulsing DC current across the load 52 can result if the second liquid detection probe 56 contacts either AC lines A or B. In the event pulsing DC current flows through the load 52, a destructive chatter can be produced in the elements of the load 52. As it may be difficult, if not impossible, to completely isolate the liquid detection probes of the control switch from the AC lines of the associated electrical system, the problems associated from such contact may be minimized by providing a ground common to the DC control switch and the AC electrical system.

Additional problems are posed by the use of a control switch to control an irrigation system based upon the level of ground moisture. As previously discussed, if the AC source voltage contacts a moisture detection probe, the solenoid which controls the flow of water to the sprinkler would begin to chatter. Electrical contact between the associated electrical system and the control switch could occur if the insulation which separates the associated electrical system from the control switch is broken. Under these circumstances, the AC source voltage could be conducted through moist ground to the control switch. In addition, during the operation of the solenoid, the solenoid stem receives a current coupling through the coil and the water transfers this voltage through the water which, inturn, transfers it to the metallic pipe which is grounded to the earth. As a result, the AC source voltage electrically connects with the control switch.

SUMMARY OF THE INVENTION

In one embodiment, the present invention is of a control switch for controlling the operation of an irrigation system based upon the moisture level of the ground in an area to be irrigated. The control switch, which typically controls an alternating current source and electrically operated irrigation equipment connected in series with the current source, includes first and second moisture detection probes positioned at first and second underground locations in the area to be irrigated such that soil separates the first and second moisture detection probes. The control further includes means for turning the electrically operated irrigation equipment on when the soil separating said first and second moisture detecting probes is dry and means for turning said electrically operated irrigation equipment off when the soil separating the first and second moisture detecting probes is wet.

In another embodiment, the present invention is of a control switch for controlling the operation of an irrigation system based upon the moisture level of the ground in an area to be irrigated. The control switch, which typically controls an alternating current source and electrically operated irrigation equipment connected in series with the current source, includes first and second moisture detection probes positioned at first and second underground locations in the area to be irrigated such that soil separates the first and second moisture detection probes and such that the second moisture detection probe is connected to ground. The control switch further includes a transistor connected to the first moisture detection probe at its gate and to ground at its source, a bi-stable semiconductor device connected at its first junction to the drain of the transistor, to the electrically operated irrigation equipment at its second junction and to the electrical alternating current source and ground at its third junction, a first capacitor connected between the drain and gate of the transistor, and a first resistor connected between the transistor drain and ground. The first capacitor charges when the soil separating said first and second moisture detecting probes is dry, thereby providing a positive conductive charge at the transistor gate, thereby turning the electrically operated equipment on to begin irrigating the land, and the first resistor maintains the positive conductive charge at the transistor gate, thereby keeping the irrigation equipment in the on condition until the soil separating the first and second moisture detection probes is moist. When the soil is moist, a conductive path between the transistor gate and ground is provided, thereby removing the positive conductive charge from the transistor gate and turning the electrically operated irrigation equipment off.

It is an object of this invention to provide a DC control switch for controlling an associated AC electrical system which shares a common ground with the associated AC electrical system.

It is another object of this invention to provide a control switch for controlling an associated AC electrical system which minimizes the need for insulating the associated electrical system from the control switch.

It is yet another object of the invention to provide a control switch for an irrigation system which controls the operation of electrically operated irrigation equipment associated therewith based upon ground moisture.

It is still yet another object of this invention to provide a control switch for an irrigation system which controls the operation of the electrically operated irrigation equipment associated therewith based upon ground moisture and which shares a common ground with the irrigation equipment.

Yet another object of this invention is to provide a control switch for an irrigation system which controls the operation of the electrically operated irrigation equipment associated therewith based upon ground moisture and for which electrical conduction between the AC source for the electrical equipment system and the DC control switch does not effect performance of the control switch.

BRIEF DESCRIPTION OF THE DRAWINGS

The invention will be better understood and its numerous objects and advantages will become apparent to those skilled in the art by reference to the following drawings, in which:

FIG. 3b is a schematic diagram of the control switch of FIG. 3a;

FIG. 4b is a schematic diagram of an alternate embodiment of the control switch of FIG. 4a;

FIG. 5b is a schematic diagram of an alternate embodiment of the control switch of FIG. 5a;

FIG. 6b is a schematic diagram of an alternate embodiment of the control switch of FIG. 6a;

FIG. 6c is a schematic diagram of still another alternate embodiment of the control switch of FIG. 6a;

FIG. 6d is a schematic diagram of still yet another alternate embodiment of the control switch of FIG. 6a;

DETAILED DESCRIPTION OF THE INVENTION

For purposes of the discussion to follow, it should be clearly understood that a control switch is "OFF" whenever current flows through the control switch in an amount insufficient to engage relays included in a load associated therewith, and a control switch is "ON" whenever current flows through the control switch in amounts sufficient to engage the relays included in a load associated therewith. Also for purpose of the discussion to follow, it should be further understood that liquid detection probes for which there is insufficient resistance across the probes to turn the control switch on are hereby defined as "dry" probes and that liquid detection probes for which there is sufficient resistance across the probes to turn the control switch OFF are hereby defined as "wet" probes.

Figure 1:
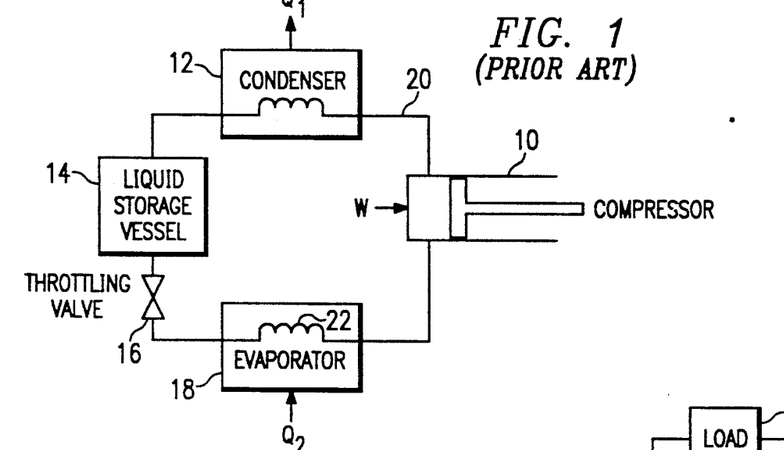
FIG. 1 is a block diagram of an air refrigerator system.

Referring first to FIG. 1, a typical refrigerator consists of a compressor 10, a condenser 12, a storage tank 14, a throttling valve 16, and evaporator 18 connected by suitable conduits 20 with intake and outlet valves (not shown). The refrigerant stored in the storge tank 14 is a liquid which partly vaporizes and cools as it passes through the throttling valve 16. Among the common refrigerants are ammonia, sulphur dioxde and various halides of methane and ethane. Nearly constant pressures are maintained on either side of the throttling valve 16 by means of the compressor 10. The mixed liquid and vapor entering the evaporator 18 is colder than the near-surround. Thus, the mixed liquid and vapor absorbs heat from the interior of the refrigerator box or cold room and completely vaporizes. The vapor is then forced into the compressor 10, where its temperature and pressure increased as a result of the compression. The compressed vapor then pours into the condenser 12, where it cools down and liquifies as the heat is transferred to outside air, water, or other fluid medium in the condenser cooling coils 12.

In such air refrigeration systems, the evaporator 18 often lowers the air temperature below the dew point. As a result, moisture will condense on the evaporator coil 22. For this reason, air refrigeration systems are also provided with a condensate pan for collecting moisture condensed on the evaporator coil 22. The moisture collected by the condensate pan is then removed by an overflow line. However, dust and other airborne debris may accumulate in the condersate pan and eventually plug the overflow line. In other circumstances, a sewer line to which the overflow line is typically connected may become plugged due to causes unrelated to the air refrigeration system itself. In any event, whenever the condensate pan is prevented from draining, the level of condensate in the pan will steadily increase until the pan overflows, thereby causing water damage to the air refrigeration system.

One solution to this problem was to build a secondary overflow pan connected to a separate overflow line beneath the primary overflow pan. When the overflow line of the primary overflow pan became plugged, condensate would collect in the primary pan until filled. The overflow would then spill over into the secondary overflow pan and drain by way of the overflow line of the secondary overflow pan. While such secondary overflow drainage systems made condensate overflows less likely, they offered no protection from overflows if both drainage systems were blocked. As a result, overflow protection systems often include a switching system to turn the air refrigeration system off in the presence of condensate overflow conditions.

Figure 2:
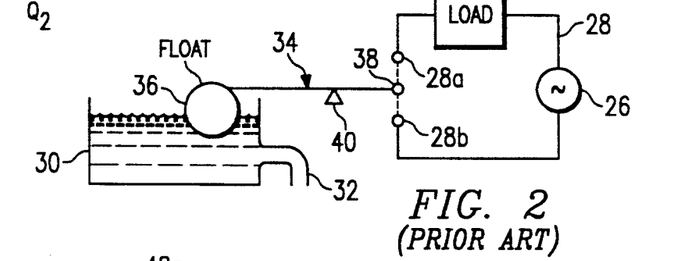
FIG. 2 is a schematic of a float control switch for an air refrigeration system.

Referring next to FIG. 2, a float activated switching system for an air refrigeration system may now be seen. The float activated switching system in FIG. 2 consists of a load 24 connected in series to a low voltage AC source such as a 24 volt AC transformer using electrical connectors 28. The load 24 may include the air refrigeration system of FIG. 1 connected to a relay via a thermostat of conventional design. The overflow pan 30, which may either be a primary overflow pan or a secondary overflow pan, collects condensating liquid which drains via the overflow line 32. A float actuated switch 34 includes a float 36 positioned in the overflow pan 30 and an electrical contact 38 balanced by a pivot or fulcrum 40. When the level of condensate in overflow pan 30 is low, the contact 38 is engaged with the contacts 28a and 28b of the air refrigeration system 24, thereby permitting power to flow through the load 24, thus maintaining the air refrigeration system 24 in an ON condition. In the event that the overflow line 32 becomes plugged, condensate will begin to accumulate in the overflow pan 30, raising the level of the float 36. When the float 36 has been raised a specified height, the contact 38 will disengage from the contacts 28a and 28b, thereby disconnecting the load 24 from the AC source and turning the air refrigeration system OFF. Unfortunately, due to space limitations during the construction of air refrigeration systems, float actuated switches such as the one described herein are often too large to attach to an overflow pan positioned within the cooling coil housing. In addition, air currents within the cooling coil housing could easily displace the float, thereby resulting in erroneous switching. Finally, float activated switches are particularly undesirable when liquid is draining at a rate just slightly less than the rate at which condensate is being collected by the overflow plan. For example, the overflow line may be partially plugged such that drainage of the accumulated condensate from the overflow pan is occurring at a slightly below normal rate while condensate continues to accumulate at a normal rate. Under these circumstances, the switch could rapidly oscillate between the ON and OFF states, a condition which may result in damage to the air conditioning system.

Figure 3A:
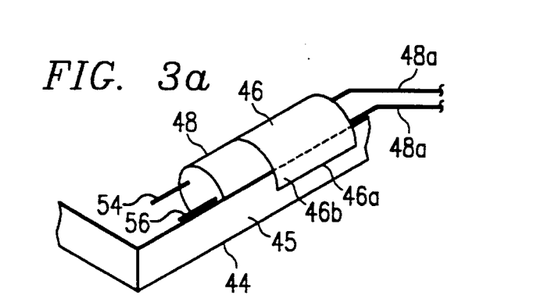
FIG. 3a is a perspective view of a control switch for detecting the accumulation of moisture.

Referring now to FIG. 3a, a control switch for detecting the accumulation of moisture and controlling the operation of an associated air refrigeration system based upon the detected accumulation of moisture which is constructed in accordance with the teachings of the present invention shall now be described in detail. As previously discussed, condensate from the cooling coil of the air refrigeration system will begin to accumulate in an overflow pan 44 if the drain (no shown in FIG. 3a) of the overflow pan 44 is partially or completely clogged. To detect an undesirably high level of accumulated water in the overflow pan 44, a control switch 48 is mounted to a sidewall 45 of the overflow pan 44 by mounting means such as a cylindrical clamp housing 46 surroundingly attached to the control switch 48 and having a slitted sidewall 46a for permitting the outward extension of a first section 46b of the cylindrical clamp housing 46 for receiving the sidewall 45 of the overflow pan 44 between the outwardly extending section 46b and the control switch 48. Preferably, the control switch 48 is mounted along the top of the sidewall 45 such that a pair of moisture detecting probes 54, 56 extend outwardly from the control switch 48 near, but not at, the top of the overflow pan 44. So long as the water accumulating in the overflow pan 44 does not contact the liquid detection probes 54, 56, a condensate overflow condition does not exist and the air refrigeration system associated therewith operates normally. In the event that sufficient water accumulates in the overflow pan 44 such that the water contacts the moisture detecting probes 54, 56, an overflow condition exists and the control switch 48 will disconnect the associated air refrigeration system in a manner to be more fully described below. The associated system will then remain off, even if the level of water in the overflow pan 44 drops such that the water no longer contacts the liquid detection probes 54, 56, until the control switch 48 is reset.

Figure 3B:
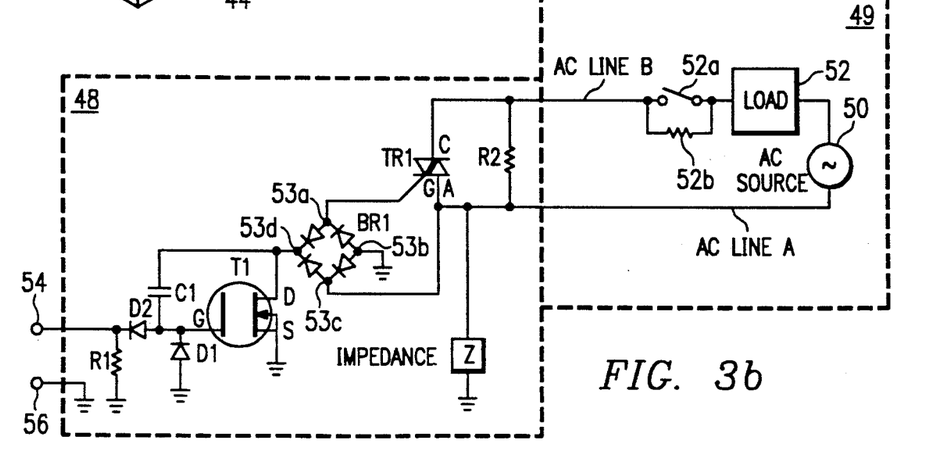

Referring now to FIG. 3b, the operation of the control switch 48 for controlling an associated electrical system 49 shall now be described in greater detail. The associated electrical system includes an AC source 50, for example, a 24 volt transformer, connected in series with a load 52 and a switch 52a such as a thermostat which is also connected in series with the control switch 48 and the control switch 48 is connected in parallel with a resistor R2. The resistor R2 serves a particularly unique function with respect to the thermostat 52a. The value of the resistor R2 is chosen large enough so that when the control switch 48 is OFF, the combined small current through the control switch 48 and through the resistor R2 is insufficient to engage the relay. In other words, the control switch 48 is still OFF. Typical thermostats utilize a bypass or surge resistor 52b, typically in the order of 4000 ohms. This surge resistor 52b prevents arcing across the contacts of the thermostat 52a whenever the contacts are engaged or disconnected as called for by the temperature setting. Were the resistor R2 not present, the thermostat resistor 52b can cause the positive charge at the gate G of the transistor T1 to leak off. Then, the thermostat 52a calls for the relay(s) to engage, the control switch 48 may not turn ON. Thus, the resistor R2 stabilizes the control switch 48 against this process. It should be further noted that a light bulb could be suitably chosen as to provide the same function as the resistor R2 and would also light up and show when the control switch 48 was OFF. Typically, the load 50 includes electrical equipment such as the air refrigeration system previously described with respect to FIG. 1, a thermostat of conventional design and relays.

However, if both the resistor R2 and the load 52 are fixed, decreasing the bypass resistor 52b, will eventually cause the control switch 48 to fail to come ON when desired. Similarly, if the resistor R2 and the bypass resistor 52b are fixed, increasing the load impedance will eventually cause the control switch 48 to fail to come on as well. Finally, if the load 52 and the bypass resistor 52b are fixed, increasing the resistor R2 will also eventually cause the control switch 48 ti fail to come on. Thus, there is a unique function between the load impedance, the resistor R2 and the bypass resistor 52b. Futhermore, certain conditions will aggravate this phenomena, i.e. cause the control switch 48 to fail for a given bypass resistor 52b, load and resistor R2 which would otherwise not normally fail. These conditions appear to come from some sort of electrical coupling between the AC source 50, usually a transformer, and the control switch 48 and/or by electrical "Noise" in the air, line noise, etc. caused by fluorescent lights, switch gear, etc. If a very slight impedance ("Z") 51, either resistive, capacitive or inductive, is provided to the circuit as illustrated in FIG. 3b, this problem will be alleviated. Typically, the impedance 51 is in the range of one million ohms and is connected from the anode of the triac TR1 to ground where ground is not the control switch ground but true ground such as a metal water pipe.

The control switch 48 includes a three junction, bistable semiconductor device that can be switched from an ON state to an OFF state such as a triac TR1 having cathode (C), anode (A) and gate (G) terminals. The triac TR1 is connected at the C terminal to the load 52 and at the A terminal to the AC source 50, thereby connecting the triac TR1 of the control switch in series with the load 52 and the AC source 50 of the electrical system 49. The gate terminal of the triac TR1 is connected to a first terminal 53a of a bridge rectifier circuit BR1 constructed of four rectifier diodes DD1, DD2, and DD3 and DD4 and the anode of the triac TR1 is connected to a second terminal 53c of the bridge rectifier circuit BR1. The bridge rectifier circuit BR1 converts alternating current flowing in the AC side, i.e. the side of the bridge rectifier circuit BR1 which includes the AC source 50, to a direct current flowing in the DC side, i.e. the circuitry on the side of the bridge rectifier circuit BR1 opposite to the AC source 50, thereby resulting in a positive voltage at terminal 53d. Finally, a terminal 53b of the bridge rectifier circuit BR1 is connected to ground.

On the DC side of the bridge rectifier circuit BR1, an N-channel MOSFET transistor T1 or similar device such as a bipolar transistor has a drain terminal D connected to terminal 53d, a gate terminal G and a source terminal S connected to ground. A capacitor C1 is corrected between the gate terminal G of the transistor T1 and the terminal 53d. The first liquid detection probe 54 is connected to the gate terminal G of the transistor T1 and to a resistor R1. The other end of the resistor R1 is connected to ground. A second liquid detection probe 56 is also connected to ground. A first diode D1 is connected between the gate terminal G of the transistor T1 and ground to keep the gate terminal G of the transistor T1 from going excessively negative, i.e. sufficiently negative not to damage the transistor T1, due to static charges that may be incurred at the first liquid detection probe 54 and also to help provide a path for initially charging C1 and/or resetting C1 with a positive charge, thereby producing an ON condition when current is interrupted and reapplied to the control switch 48. A second diode D2 is connected between the first liquid detection probe 54 and the gate terminal G of the transistor T1 to protect the gate terminal G of the transistor T1 from positive surges, static charges or other excessive voltages and currents which may contact the liquid detection probe 54, thereby providing protection for the load 24.

With no liquid contacting the liquid detection probes 54, 56, when a voltage is suddenly applied across the triac TR1, for example, from the AC source 50 during starting of the electrical system 49, the control switch 48 is turned ON. The capacitor C1 charges, thereby causing the transistor T1 to conduct current via the bridge circuit BR1 which, in turn, triggers the triac TR1 into conduction, thereby conducting current in the electrical system 49 such that electrical equipment included as part of the load 52 will operate. During such operation, the voltage drop across the triac TR1 will typically be less than 2.0 volts.

If, however, the positive charge at the gate terminal G of the transistor T1 is neutralized and/or replaced with a negative charge, for example, by providing a conductive path from the gate terminal G of the transistor T1 to ground, the transistor T1 is turned OFF, thereby turning the control switch 48 OFF. Thus, if liquid accumulating in the overflow pan 44 contacts the liquid detection probes 54, 56, a high resistance conductive path from the gate terminal G of the transistor T1 to ground via the low ionic strength liquid typically produced as condensate in an air refrigeration system will permit the voltage stored by the capacitor C1 to leak off, thereby switching the control switch 48 into the OFF state. Thus, by varying the value of the resistor R1, the sensitivity of the control switch 48 to the presence of water at the liquid detection probes 54, 56 may be modified, i.e. the sensitivity may be increased by decreasing the value of the resistor R1. Similarly, the sensitivity of the control switch 48 may also be increased by reducing the value of the capacitor C1. By increasing the sensitivity of the control switch 48 such that low ionic liquids such as those produced as condensate in an air refrigeration system may be readily detected, it is hereby contemplated that the control switch 48 will not be limited to the detection of liquids having a high ionic strength but shall also be able to satisfactorily detect the presence of low ionic liquids, for example, commercially available distilled water, rain water and certain other organic solutions of low ionic stength, with a pair of liquid detection probes of dimensions 0.1 inch length and 0.035 inch diameter spaced over 1.0 foot apart. This represents a significant improvement in the sensitivity of liquid detection probes to be utilized with low voltage supplied, i.e. 0.8 to 1.4 volt, control switches.

When the positive charge at the gate terminal G of the transistor T1 has been removed, the resistor R1 will maintain a neutral or negative potential at the gate. As a result, when the conductive path from the gate terminal G of the transistor T1 to ground via the liquid contacting the liquid detection probes 54, 56 is removed, for example, by the removal of the liquid accumulated in the overflow pan 44, the resistor R1 will maintain a neutral or negative potential at the gate terminal G of the transistor T1, thereby preventing the control switch 48 from turning on. In such a manner, the control switch 48 switches into and locks in the OFF condition when the liquid detection probes 54, 56 detect an accumulation of liquid in the overflow pan 44 and will not return to the ON state when the accumulated liquid is removed. The control switch 48 is reset, i.e., returned to the ON state by permitting the charge across the capacitor C1 to completely neutralize followed by the re-establishment of current through the control switch 48 thus returning a positive charge to the gate terminal G of the transistor T1. For example, reconnecting the AC source 50 by providing a voltage surge across the control switch 48 or by allowing the neutral or negative charge at gate G of the transistor T1 to leak off followed by turning the power back ON.

Figure 3C:
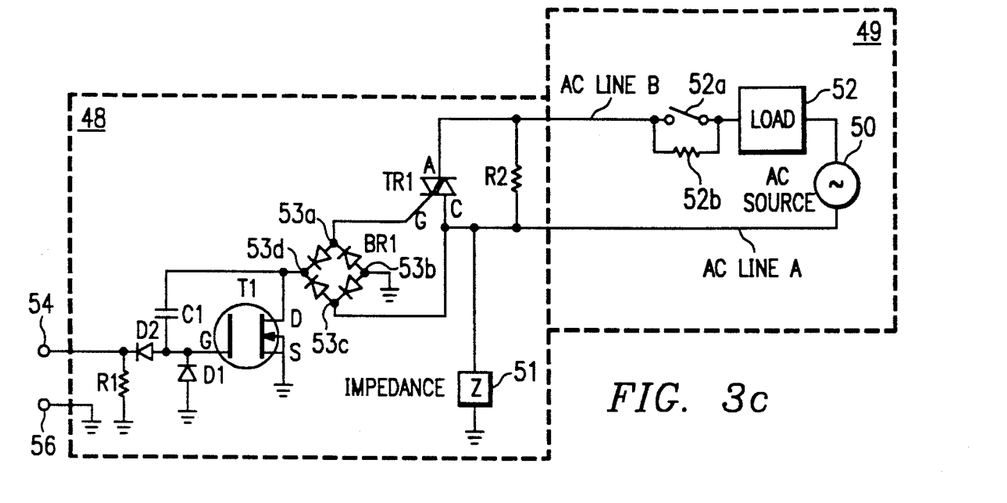
FIG. 3c is a schematic diagram of another aspect of the control switch of FIG. 3b.

Referring next to FIG. 3c, another aspect of the embodiment of the invention illustrated in FIG. 3b may now be seen. In this aspect of the invention, the impedance 51 is connected to the cathode of the triac TR1. In turn, the triac TR1 is connected at the A terminal to the load 52 and at the C terminal to the AC source 50.

Exemplary values for the components of the control switch 48 schematically illustrated in FIG. 3b or the control switch 48 schematically illustrated in FIG. 3c such that the control switch 48 shall operate as set forth above are as follows:

| Component | Value |
|---|---|
| TR1 | 1-6 a, 200-400 v; |
| BR1 | 50-100 PRV, 1-2 a; |
| T1 | 60-200 VDS, 0.4-5.0 RDS, 1-5 a; |
| R1 | 200K-22 Meg; |
| R2 | 500-50,000 ohms; |
| C1 | 10 pf-.1 mf; |
| D1 | 50-100 PRV; and |
| D2 | 50-100 PRV. |

Figure 4A:
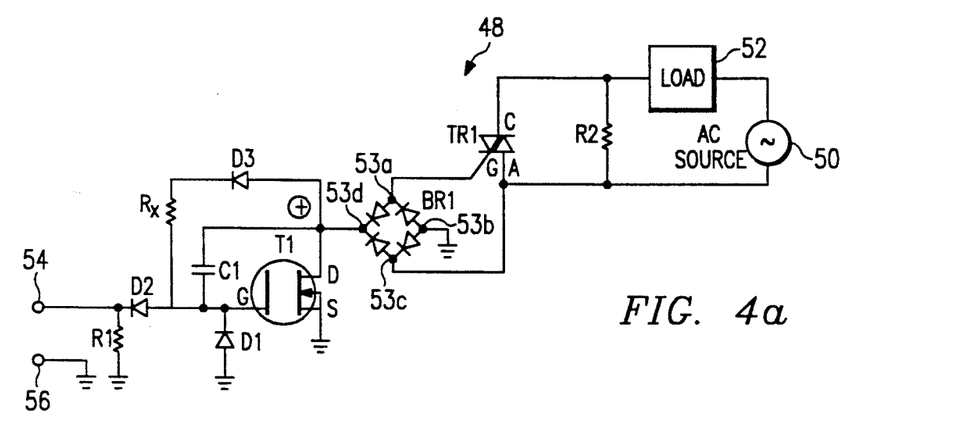
FIG. 4a is a schematic diagram of a second embodiment of the control switch of FIGS. 3a-c.

Referring next to FIG. 4a, a second embodiment of the control switch 48 in which the normally ON control switch 48 switches to the OF state when the liquid contacts the liquid detection probes 54, 46, and then resets, i.e. returns to the ON state, within a finite time period after the liquid no longer contacts the liquid detection probes 54, 56 shall now be described. In this embodiment, a diode D3 and a large resistor $R_x$ are connected in series between the positive terminal 53d if the bridge circuit BR1 and the gate terminal G of the transistor T1 to provide a leakage path for the capacitor C1. Accordingly, when the liquid no longer contacts the liquid detection probes 54, 56, the positive charge at the gate terminal G of the transistor T1 can be re-established, thereby causing the transistor T1 to conduct current via the bridge circuit BR1 which, in turn, triggers the triac TR1 into conducting current.

Figure 4B:
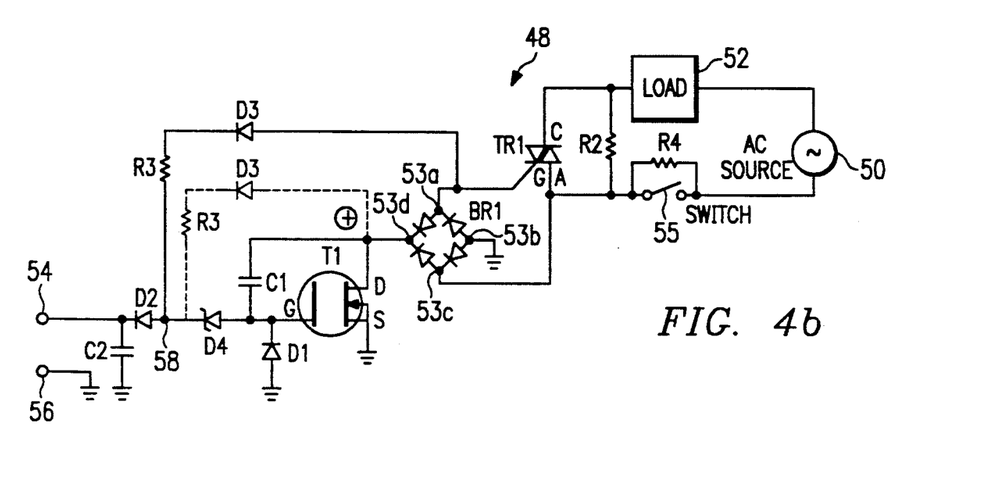

Referring next to FIG. 4b, an alternate embodiment of the control switch of FIG. 4a in which the normally ON control switch 48 switches to the OFF state when the liquid contacts the liquid detection probes 54, 56 and the, after the liquid no longer contact the liquid detection probes 54, 56, the control switch 48 resets after a time delay, may be provided by replacing the resistor R1 with a capacitor C2 and by installing a zener diode D4, a resistor R3, and a diode D3 between the gate terminal G of the transistor T1 and the terminal 53a of the bridge circuit BR1. When the control switch 48 is in the ON state, a positive charge across the capacitor C1 holds the gate terminal G of the transistor T1 positive. The capacitor C2 is similarly charged. When the liquid contacts the liquid detection probes 54, 56, a conductive path from the gate terminal G of the transistor T1 to ground is provided. Accordingly, the transistor T1 and the control switch 48 are turned OFF. When the liquid is removed from the liquid detection probes 54, 56, the capacitor C1 maintains a negative charge at the gate terminal G of the transistor T1, thereby keeping the control switch 48 in the OFF state while a charge begins to build on the capacitor C2. When the charge on the capacitor C2 is sufficient to overcome the zener breakdown voltage, a position conductive charge is provided at the gate terminal G of the transistor T1, thereby turning the transistor T1 and the control switch 48 on. In an alternative embodiment, the diode D3 and the resistor R3 may be connected in series between the terminal 53d of the bridge circuit BR1 and the gate terminal G of the transistor T1 as shown in phantom in FIG. 4a to produce the same result. Finally, the time delay between removing the liquid from the liquid detection probes 54, 56 and the charging of the gate terminal G of the transistor T1 may be increased by increasing the value of the resistor R3 and the capacitor C2. An on/off control switch 55 may be connected between the load 52 and the AC source 50. When no liquid covers the liquid detection probes 54, 56 and when current first enters the control switch after all charges have leaked of the capacitor C1 and the capacitor C2, i.e. the circuit has been completely disconnected by the above-identified on/off switch 55 for a long time, the control switch 48 will go through the delay period before turning on. If this is undesirable, a minimal current such that the current is small enough to consider the load 24 off should be kept going through the control switch 48 and the load 52 at all times. This can be accomplished via a bypass resistor R4 in parallel with the on/off control switch 55.

Exemplary value for the components of the control switch 48 so that the control switch 48 shall operate as herein described are as follows:

| Component | Value |
| --- | --- |
| R3 | 4.7 meg; |
| D4 | 13.0 v zener, 500 mw; |
| C2 | 0.68 mf; and |
| C1 | 330 pf. |

Figure 5A:
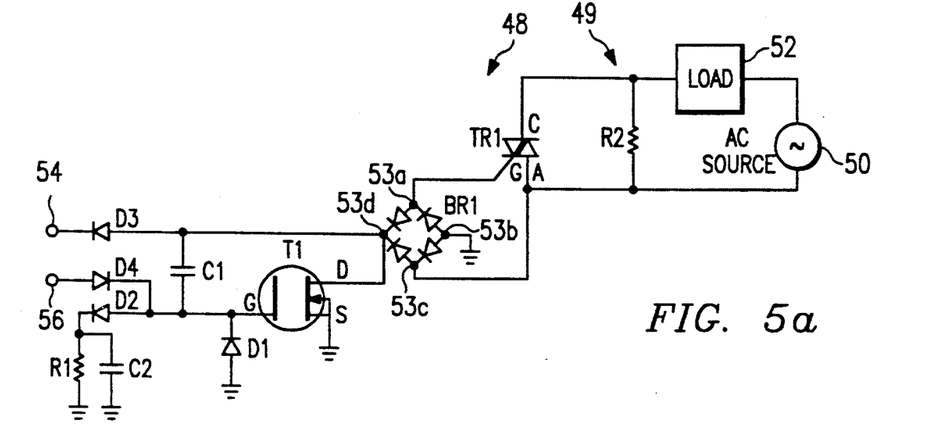
FIG. 5a is a schematic diagram of a third embodiment of the control switch of FIGS. 3a-c.
Figure 5B:
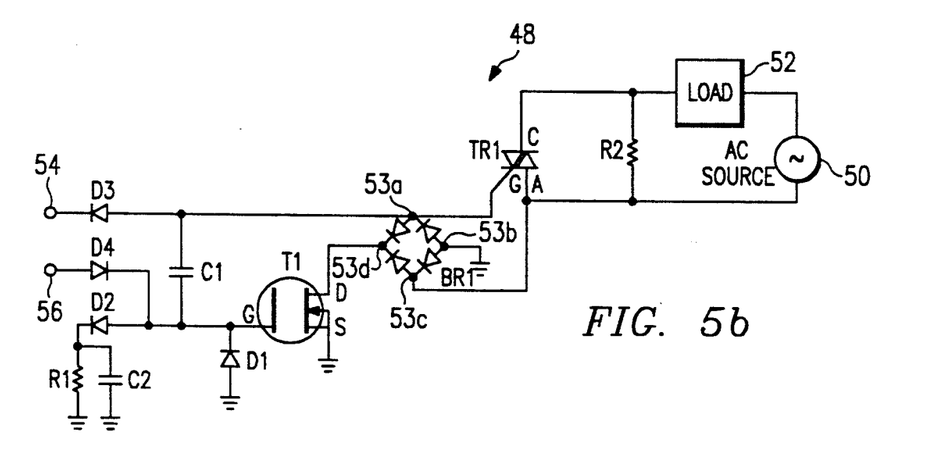

Referring next to FIG. 5a, a third embodiment of the control switch of FIGS. 3a-b in which the normally OFF control switch 48 will turn on when liquid contacts the liquid detecting probes 54, 56 and will remain on after the liquid has been removed from the liquid detecting probes 54, 56. To modify the control switch 48 of FIG. 3b to produce the control switch 48 of the present embodiment, a surge capacitor C2 is installed in parallel with the resistor R1. Also, the liquid detecting probe 54 is now connected to the terminal 53d of the bridge circuit BR1 for greater sensitivity and the liquid detecting probe 56 is now connected to the gate terminal G of the transistor T1. The diodes D3 and D4 are added to protect the control circuit 48 from surges, static charges or other excessive voltages and currents which may contact the liquid detecting probes 54, 56 and which may prove damaging to the control circuit 48. Alternately, a large resistor may be substituted for the diode D4 for the same purpose. When a voltage is suddenly applied across the triac TR1, for example, from the AC source 50 during starting of the electrical system 49, the capacitor C2 brings the gate G of the transistor T1 to ground and the transistor T1 will not conduct current via the bridge circuit BR1 and the control switch remains OFF. When liquid contacts the liquid detecting probes 54, 56, a positive charge is built at the gate G of the transistor T1, turning the transistor T1 on, where it is maintained by the capacitor C1. When the liquid is later removed from contact with the liquid detecting probes 54, 56, however, the positive condition remains at the gate G of the transistor T1. An alternate embodiment of the control switch 48 of FIG. 5a may be seen by reference to FIG. 5b. In this embodiment, the liquid detecting probe 54 is connected to the terminal 53a of the bridge circuit 54. Exemplary values for the components of the control switch 48 so that the control switch 48 shall operate as herein described are as follows:

| Component | Value |
| --- | --- |
| Resistor replacing D4 | 1.0 Meg; |
| C2 | .22 mf; and |
| C1 | .0022 mf. |

The stabilizing resistor R2 which is illustrated in FIG. 3 as connected between the anode terminal and the cathode terminal of the triac TR1 is required for the circuit but for a different reason. If the resistor R2 is not present, and if the control switch has no charges on either the capacitor C1 or the capacitor C2, i.e. the circuit has been without power for a long period, when the AC source 50 is first connected, a surge may cause the control switch 48 to momentarily turn on. The resistor R2 prevents this such that the control switch 48 is always OFF whenever power is either ON or OFF the circuit until such time as the liquid covers the liquid detection probes 54, 56, the occurrence of which, as previously noted, locks the control switch 48 ON.

Figure 6A:
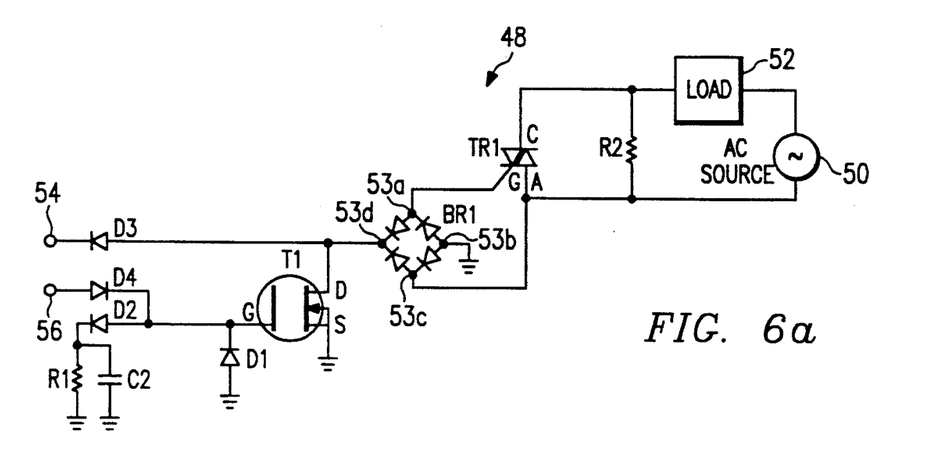
FIG. 6a is a schematic diagram of a fourth embodiment of the control switch of FIGS. 3a-c.

Referring next to FIG. 6a, a second embodiment of the control switch of FIGS. 5a-b in which the control switch 48 which would reset immediately or in a finite period after liquid no longer contacts the liquid detection probes. In this embodiment the capacitor C1 has been removed and the value of the capacitor C2 has bee reduced. The capacitor C2 protects the gate terminal G of the transistor T1 from in-rush current when current first enters the control switch 48, thereby preventing the control switch 48 from temporarily turning on. An alternate embodiment of the control switch 48 of FIG. 6a may be seen by reference to FIG. 6b. Here, the first liquid detecting probe 54 is connected to the terminal 53a of the bridge circuit BR1.

Figure 6B:
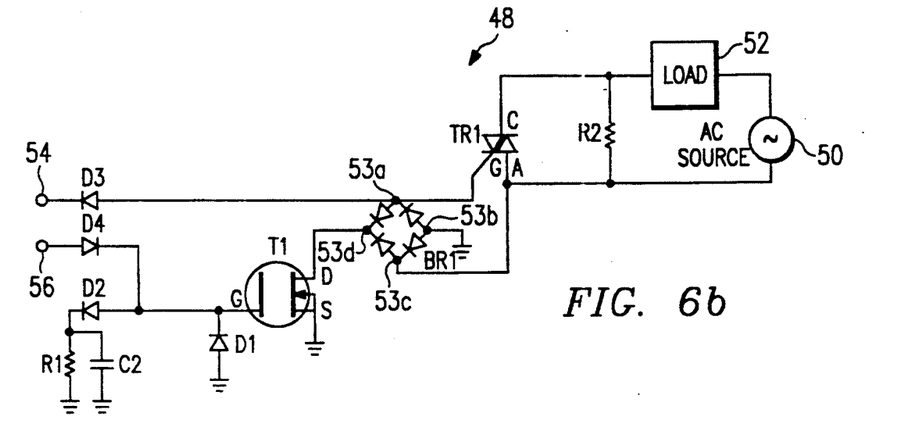
Figure 6C:
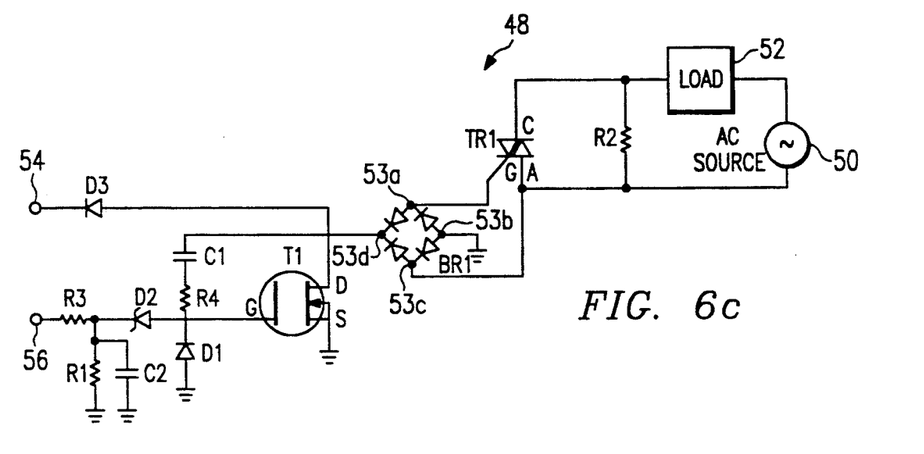

Finally, referring now to FIG. 6c, yet another alternate embodiment of the control switch 48 illustrated in FIGS. 6a-b. In this embodiment, the control switch 48 is modified such that a delay is provided before the control switch turns on. By doing so, undue chatter or oscillations on the load will be prevented even if the liquid level is oscillating. In this embodiment, the diode D2 is a zener diode and a capacitor C1 and a resistor R4 are connected in series between the gate terminal G of the transistor T1 and the terminal 53d of the bridge circuit BR1. When voltage is first applied to the circuit, the control switch 48 is initially off because the surge capacitor C2 and the resistor R1 bring the gate G of the transistor T1 low. When fluid contacts the probes, a positive voltage from the diode D3 causes current to flow through the fluid and through the resistor R3, thereby producing a positive charge on the capacitor C2. As the voltage on the surge capacitor C2 builds up, it will eventually exceed the zener breakdown voltage of the diode D2, and a positive charge will then develop on the capacitor C1 and the transistor T1 turns on, thereby turning the control switch 48 on. The time period for the capacitor C2 to build the charge necessary to overcome the zener breakdown voltage is the time delay period before the control switch 48 turns on. This period increases with an increase in the value of the resistor R3 and the surge capacitor C2. In an alternate embodiment illustrated in FIG. 6d, the liquid detector probe 54 is connected to the gate G of the triac TR1. As before, a diode D3 is provided between the liquid detector probe 54 and the connecting terminal to protect the control switch from surges, static charges or other excessive voltages and currents which may contact the liquid detecting probes 54, 56 and which could possibly be damaging to the control circuit 48. In this embodiment, the capacitor C1 and the resistor R4 stabilize the control circuit in the on position when liquid contacts the liquid detecting probes 54, 56. After liquid covers the liquid detecting probes 54, 56 and the control switch 48 is turned on, the capacitor C2 begins to discharge through the resistor R1.

Figure 6D:
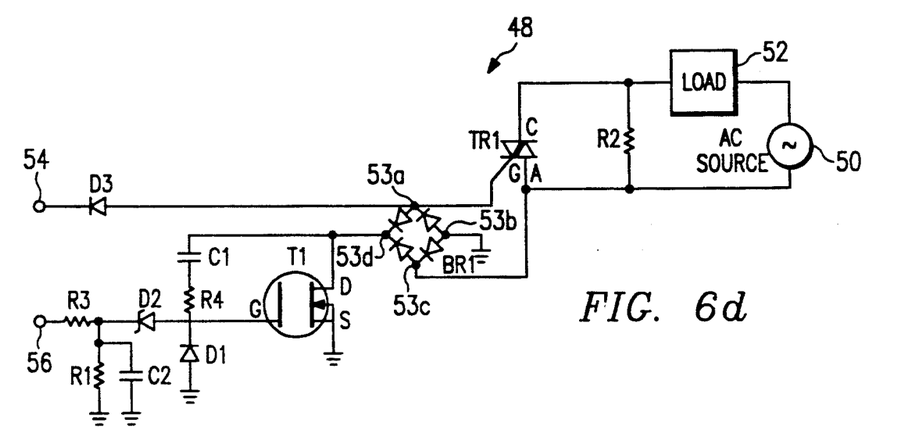

Exemplary values for the components of the control switch 48 so that the control switch 48 shall operate as herein described are as follows:

| Component | Value |
| --- | --- |
| R3 | 1.0 Meg; |
| C2 | 0.68 mf; |
| R1 | 4.7 Meg; |
| C1 | 330 pf |
| R4 | 1.0 Meg; and |
| D2 | 13.0 v zener diode, 500 mw. | p All of the various embodiments of the present invention which have been discussed herein have utilized an AC source 50 as the current supply for the circuit. It should be clearly noted, however, that the circuits described herein will also operate with an unfiltered DC source with either lead to the control switch 48 connected to the unfiltered source, but will not operate with a filtered DC source.

Figure 7:
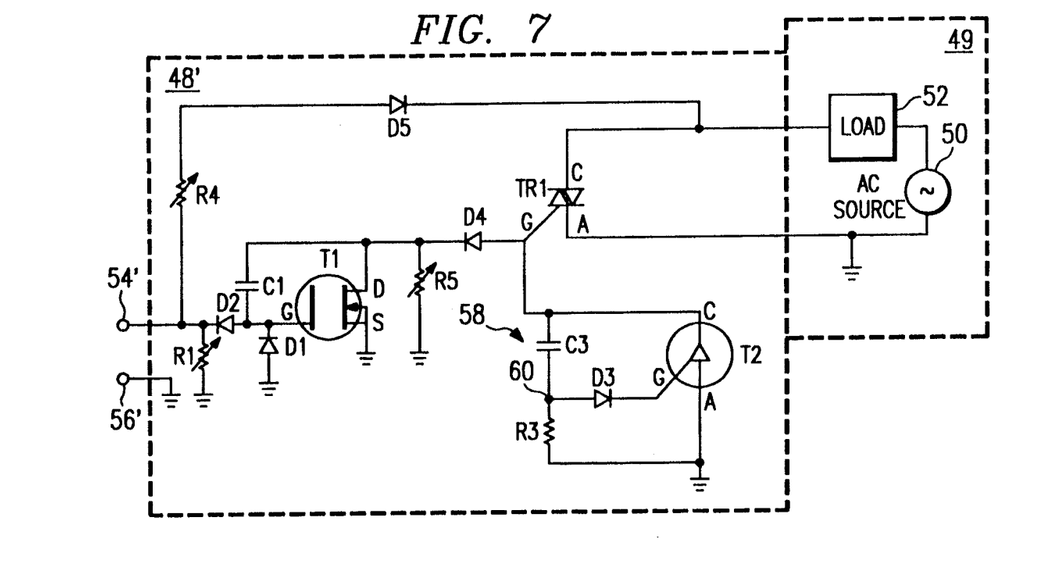
FIG. 7 is a schematic diagram of first and second embodiments of a common ground control switch for monitoring ground moisture and controlling the operation of electrically operated irrigation equipment associated therewith based upon the level of ground moisture which is constructed in accordance with the teachings of the present invention.

Referring next to FIG. 7, the configuration and operation of a common ground control switch 48' for controlling an associated electrical system 49 shall now be described in greater detail. Again, the associated electrical system consists of an AC source 50 connected in series with a load 52.

The common ground control switch 48' includes a three junction, bistable semiconductor device that can be switched from an ON state to an OFF state such as a triac TR1 having cathode (C), anode (A) and gate (G) terminals. The triac TR1 is connected at the C terminal to the load 52 and at the A terminal to the AC source 50, thereby connecting the triac TR1 of the control switch in series with the load 52 and the AC source 50 of the associated electrical system 49. As to be more fully described below, the triac TR1 is further connected at the A terminal to a common ground for the control switch 48'. The gate terminal of the triac TR1 is connected through a rectifier diode D4 to an N-channel MOSFET transistor T1 or similar device such as a bipolar transistor. The transistor T1 includes a drain terminal D tied to the gate terminal of the triac TR1 through the rectifier diode D4, a source terminal connected to ground and a gate terminal. A capacitor C1 is connected between the gate terminal G and the drain terminal D of the transistor T1 and a variable resistor R5 is connected between the junction of the drain terminal of the transistor T1, the diode D4 and the capacitor C1 and ground. A first moisture detection probe 54' is connected to the gate terminal G of the transistor T1 and to a resistor R1. The other end of the resistor R1 is connected to ground. A second moisture detection probe 56' is also connected to ground. By varying the value of the resistor R1, which in the embodiment of the invention described herein is a variable resistor, the sensitivity of the control switch 48' to the presence of water at the moisture detection probes 54', 56' may be modified. Similarly, the sensitivity of the common ground control switch 48' may also be increased by reducing the value of the capacitor C1. In addition, a first diode D1 is connected between the gate terminal G of the transistor T1 and ground to keep the gate terminal G of the transistor T1 from going excessively negative and a second diode D2 is connected between the first moisture detection probe 54' and the gate terminal G of the transistor T1 to protect the gate terminal G of the transistor T1 from surges, static charges or other excessive voltages and currents which may contact the first moisture detection probe 54', thereby providing protection for the load 52.

For dry moisture detection probes 54', 56', when a voltage is applied across the triac TR1, the capacitor C1 charges, thereby causing the transistor T1 to conduct current. The transistor T1 triggers the triac TR1 into conduction, thereby conducting current in the electrical system 49 such that electrical equipment included as part of the load 52 will operate. Once turned ON, the resistor R5 keeps the transistor T1 on by continually supplying charge to the transistor T1. Otherwise, the capacitor C1 would tend to lose its charge over time, thereby causing the transistor T1 to fade off. In addition, by varying the value of the resistor R5, the sensitivity of the control switch 48' to the presence of water at the moisture detection probes 54', 56' may be modified.

When the positive charge at the gate terminal G of the transistor T1 is neutralized and/or replaced with a negative charge, for example, by providing a conductive path from the gate terminal G of the transistor T1 to ground, the transistor T1 is turned OFF, thereby turning the control switch 48' OFF. Thus, if there is sufficient moisture in the ground such that the moisture detection probes 54', 56' are considered wet, a low resistance, high conductive path from the gate terminal G of the transistor T1 to ground which will permit the voltage stored by the capacitor C1 to leak off and thereby switch the control switch 48' into the OFF state.

Figure 8A:
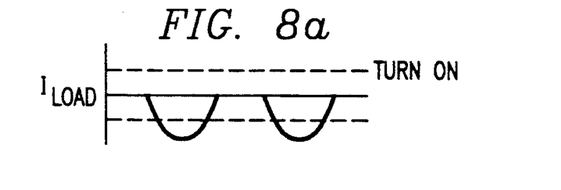
FIG. 8a is a current/time curve of the current through an electrical load associated with a dry probe, common ground control switch without pulsing current protection means and in the ON state.
Figure 8B:
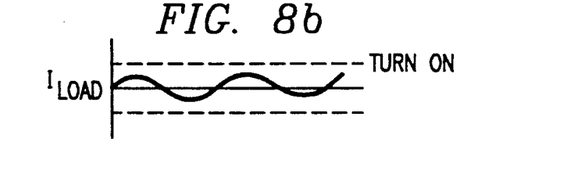
FIG. 8b is a current/time curve of the current through an electrical load associated with a wet probe, common ground control switch without pulsing current protection means and in the OFF state.

Without any pulsing current protection means which permit a common ground for the DC and AC sides, the current flow to the load would be pulsing DC current as illustrated in FIG. 8a for dry moisture detection probes 54', 56', respectively. A pulsing DC current in the load results because the rectifier diode D4 conducts only in one direction, thereby filtering out that component of the load current which provides AC current to the load 52. This effect, which is illustrated in FIG. 8a, is similar to the previously described effect upon the control switch illustrated in FIG. 3b is one of the liquid detection probes 54, 56 were accidentally grounded on the AC side. Without any pulsing current protection, leakage AC current, as illustrated in FIG. 8b, would result when the moisture detection probes 54', 56' are wet and the control switch 48' is in the OFF state.

To prevent pulsing current, the common ground control switch 48' is further provided with pulsing current protection means 58 which includes a three terminal silicon controlled rectifier ("SCR") T2 having an anode terminal connected to ground, a cathode terminal connected to the gate terminal of the transistor TR1 and a gate terminal. A capacitor C3 is connected between the cathode terminal of the SCR T2 and a terminal 60, and a resistor R3 is connected between the terminal 60 and the anode terminal of the SCR T2. A rectifier diode D3 is connected between the terminal 60 and the gate terminal of the SCR T2. The pulsing current protection circuit 58 provides a unique means to turn on an AC triac with a very slight DC current under a common ground. The pulsing current protection circuit 58 permits a positive DC signal taken from AC triac TR1 to turn on the triac TR1 when both the AC and DC portion of the control switch 48 share a common ground. In one aspect of the invention, the capacitor C3, and the resistor R3 are selected to optimize the conduction angle for the SCR R2 such that with both transistor T1 and SCR T2 off, resistor R3 and capacitor C3 maximize the current through the load 52 via T2 without turning the load ON. Thus, it is desirable to minimize the conduction angle. If, however, too small a conduction angle is selected, the SCR T2 will conduct for nearly a full half cycle and the load 52 will be in a pulsed DC state.

Figure 8C:
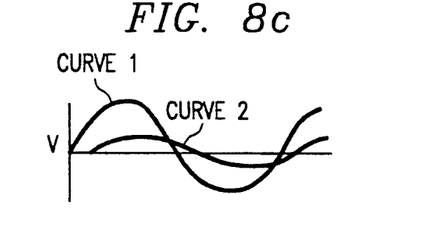
FIG. 8c is a voltage/time curve for various components of pulsing current protection means of a common ground control switch.
Figure 8D:
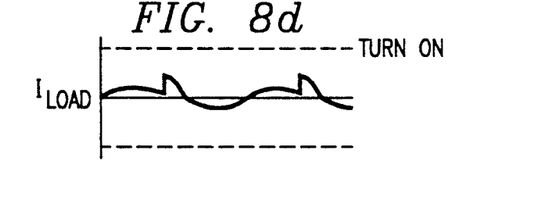
FIG. 8d is a current/time curve of the current through an electrical load associated with a common ground control switch with pulsing current protection means when the control switch is in an OFF condition.
Figure 8E:
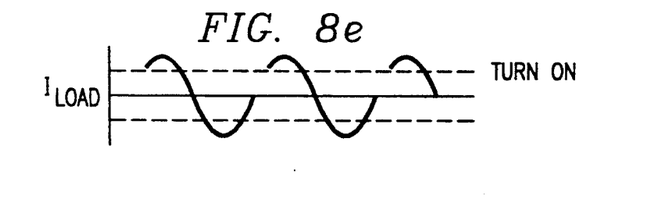
FIG. 8e is a current/time curve of the current through an electrical load associated with a common ground control switch with pulsing current protection means when the control switch is in an ON condition.

As illustrated in FIG. 8c, the voltages across both the capacitor C3 and the resistor R3 (curve 1) and the capacitor C3 alone (curved) are each sine waves separated by a small conduction angle. When the control switch 48' and the associated electrical system 49 are OFF, i.e. the moisture detection probes 54', 56' are wet and the load current as illustrated in FIG. 8b, the SCR T2 will turn on when the voltage across the capacitor C3 exceeds the voltage across the SCR T2. As a result, the load current is modified as illustrated in FIG. 8d. The electrical system 49 remains OFF as the spike in the load current caused by the SCR T2 is insufficient to turn the load 52 ON. However, when the moisture detection probes 54', 56' become dry and insufficient resistance across the moisture detection probes 54', 56' turns the transistor T1 ON, the SCR T2 modifies the load current to the AC waveform illustrated in FIG. 8e. The current through the load 52 is now sufficient to turn the electrical system 49 ON. While the AC waveform has a gap, the gap is not significant enough to effect the duty cycle and cause chatter in most relays and/or solenoids for which it is contemplated that the load 52 would include. As a result, the load 52 would not suffer from the adverse effects which could occur if a pulsing DC current were supplied thereto. Furthermore, by minimizing the conduction angle between the resistor R3 and the capacitor C3, the aforementioned gap may be minimized, thereby reducing still further the likelihood of chatter.

Rectifier diode D3 prevents a chattering condition when the resistance across the probes is right between the transition between ON and OFF states. Thus, the function of the rectifier diode D3 is to provide a sharp ON and OFF condition for the switch as the probe resistance gradually approaches the ON or OFF condition. If rectifier diode D3 is absent, the switch is sluggish and appears to hang up with an undesirable chatter problem as certain resistances close to ON or OFF.

Figure 8F:
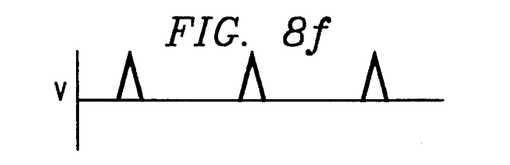
FIG. 8f is a voltage/time curve at the moisture detection probes of a common ground control switch with pulsing current protection means.
Figure 8G:
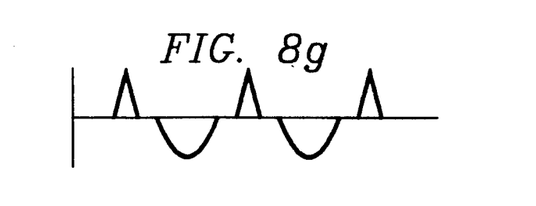
FIG. 8g is a voltage/time curve at the moisture detection probes of a common ground control switch with pulsing current protection means and false ionization protection means.

Returning now to FIG. 7, a second embodiment of the control switch 48' which prevents false indications of the moisture content of the ground will now be described. The water in the earth tends to ionize in the presence of the DC charge on capacitor C1 which dissipates to ground when the ground is moist. This ionization process has the same effect as increased ground resistance, thereby providing a false indication of the moisture level of the ground. Under these conditions, the voltage waveform at first moisture detection probe 54' would be a pulse DC voltage as may be seen in FIG. 8F. To compensate for this effect, a resistor R4 and a rectifier diode D5 (shown in phantom in FIG. 7) are connected between the moisture detection probe 54' and the cathode terminal of the triac TR1. The voltage waveform at first moisture detection probe 54' relative to ground when the switch is in the OFF state and with R4 and D5 added may be seen by reference to FIG. 8G. As may be seen herein, a negative cycle is not present. The value of the resistor R4 is selected to make the probe neutral or very slightly negative on the average with respect to ground for any given combined resistance of earth and ground. This neutral, or slightly negative, condition prevents ionization of moist earth in a direction that would give a false indication of moisture and in addition, helps to prevent corrosion (plating) of the moisture detection probes 54', 56' by maintaining them in a neutral state.

Exemplary values for the components of the common ground control switch 48' schematically illustrated in FIG. 7 such that the common ground control switch 48' shall operate as set forth above are as follows:

| Component | Value |
| --- | --- |
| R1 | 0–1 MegOhm (variable); |
| R3 | 200–2000 Ohm; |
| R4 | 0–1 MegOhm (variable); |
| R5 | 0–5 MegOhm (variable); |
| D1 | 50–100 PRV; |
| D2 | 50–100 PRV; |
| D3 | 50–100 PRV; |
| D4 | 50–100 PRV; |
| D5 | 50–100 PRV; |
| C1 | 10 pf–.2 mf; |
| C3 | .01–.5 mf; |
| TR1 | 1–6 amps, 200–400 v; |
| T1 | 6–200 VDS, 0.4–5.0 RDS, 1–5 amps; and |
| T2 | .2–3 amps, 30–400 v. |

Figure 9:
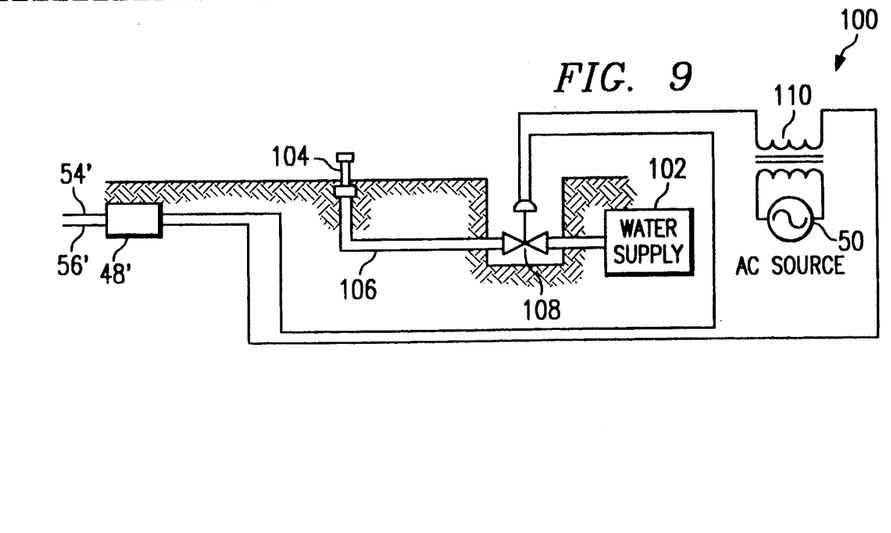
FIG. 9 is a block diagram of an overhead irrigation system which is controlled based upon the level of moisture in the ground and which includes the common ground control switch of FIG. 7.

Referring next to FIG. 9, an overhead irrigation system 100 which is controlled by a common ground control switch 48' which determines the level of moisture in the ground and controls the operation of the overhead irrigation system 100 associated therewith based upon the determined moisture level of the ground shall now be described in detail. In FIG. 9, an irrigation system is comprised of a water supply 102, for example, a holding tank filled with water or a connection to a water pipeline, for supplying water to a water distribution device such as a sprinkler 104 via a fixed water supply line 106 such as a pipe. The supply of water to the sprinkler 104 is controlled by a electrically actuated solenoid valve 108 which is positioned along the water supply line 106 and serves as the load 50 illustrated in FIG. 7. The solenoid valve 108 is configured to alternately open the water supply line 106 to permit the flow of water to the sprinkler 104 and close the water supply line 106 to prevent the flow of water to the sprinkler 104.

The solenoid valve 108 is electrically connected in series with a common ground control switch 48' having first and second moisture detection probes 54' and 56' and constructed in accordance with the teachings of the present invention. Power is supplied to the solenoid valve 108 via an AC power supply 50 stepped down to an operating voltage by a low voltage transformer 110 which is connected in series with the solenoid valve 108 and the control switch 48' and which may be viewed as the AC source 50 illustrated in FIG. 7. As to be more fully described below, when the control switch 48' detects that the moisture content of the ground surrounding the sprinkler 104 is sufficiently low, i.e., the ground is dry, the control switch 48' will turn ON, thereby causing the solenoid valve 108 to open and water to flow to the sprinkler 104 for distribution. When the moisture content of the ground surrounding the sprinkler 104 is sufficiently high, i.e., the ground is moist, the control switch 48' will turn OFF, thereby causing the solenoid vale 108 to close and water to be prevented from flowing to the sprinkler 104 for distribution.

While the control switch 48' is intended to turn the associated irrigation system 100 ON whenever the moisture detection probes 54', 56' are dry, it will also be desirable to prevent the irrigation system 100 from turning ON too often, for example, turning ON more than once a day may be undesirable depending on the intended use of the land being irrigated. Limiting how frequently the irrigation system 100 turns ON may be adjusted by the particular capacitor C1 and the resistor R1 and R5 selected. For example, if C1 and R5 are fixed and R1 is extremely large, there could be a fourfold ratio between the earth resistance which will turn the irrigation system 100 OFF and that which will turn the irrigation system 100 ON. As the moisture content of the ground increases, the resistance of the ground between the moisture detection probes 54', 56' decreases. For example, for fixed values of C1 and R5, with a very large R1, the ground resistance that would turn the switch OFF might be 10,000 Ohms. To turn the control switch 48' ON again, however, the ground would have to continue to dry until the ground resistance reached 40,000 Ohms. This ratio between turn on and turn off resistances may be modified by changing the value of resistor R1. The resistor R1 varies the ratio between turn on and turn off but does not appreciably change the turn off point for a fixed capacitor C1. Resistor R5, on the other hand, may be varied to adjust both the turn on and turn off resistance points for the system. Therefore, in one embodiment of the invention, it is contemplated that the resistors R1 and R5 are variable resistors mounted on a control board, thus permitting the operator of the irrigation system 100 to modify the frequency and duration of watering.

Thus, there has been described and illustrated herein various embodiments of a control switch for controlling an associated electrical system such as an irrigation system. However, those skilled in the art will recognize that many modifications and variations besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. For an irrigation system which includes an alternating current source and electrically operated irrigation equipment connected in series therewith, a control circuit for controlling the operation of said irrigation system based upon the moisture level in the ground in an area to be irrigated, comprising:
    a first moisture detection probe positioned at an underground location in said area to be irrigated;
    a second moisture detection probe positioned at a second underground location such that soil separates said first and second moisture detection probes;
    means for turning on said electrically operated irrigation equipment when said soil separated said first and second moisture detection probes is dry, said means for turning on further comprising;
    means for conducting current when said soil separating said first and second moisture detection probes is dry, said means for conducting current turning said electrically operated irrigation equipment on; and
    means for providing a conductive charge when said soil separating said first and second moisture detection probes is dry, said conductive charge activating said means for conducting current;
    means for maintaining said conductive charge, thereby preventing deactivation of said means for conducting current;
    means for turning off said electrically operated irrigation equipment, said means for turning off comprising a control circuit discharge path for discharging said conductive charge when said soil separating said first and second moisture detection probes is wet; and
    means for preventing corrosion of said moisture detection probes.

2. For an irrigation system which includes an alternating current source and electrically operated irrigation equipment connected in series therewith, a control circuit for controlling the operation of said irrigation system based upon the moisture level of the ground in an area to be irrigated, comprising:
    a first moisture detection probe positioned at an underground location in said area to be irrigated;
    a second moisture detection probe positioned at a second underground location such that soil separates said first and second moisture detection probes, said second moisture detection probe connected to ground;
    a transistor having a gate junction connected to said first moisture detection probe, a drain junction, and a source junction connected to ground, said electrically operated irrigation equipment being in an on condition when said gate junction of said transistor has a positive conductive charge;
    a three junction, bi-stable semiconductor device, said first junction connected to said drain junction of said transistor, said second junction connected to said electrically operated irrigation equipment and said third junction connected to said electrical alternating current source and ground;
    a first capacitor connected between said drain and gate junction of said transistor, said first capacitor charging when said soil separating said first and second moisture detection probes is dry, said charge on said first capacitor providing a positive conductive charge at said gate junction of said transistor;
    a first resistor connected between said drain junction of said transistor and ground, said first resistor producing a first means for controlling the amount of moisture needed in said soil between said first and second moisture detection probes to provide said discharge path from said gate junction of said transistor to ground; and
    a second resistor connected between said first moisture detection probe and ground, said second resistor producing a second means for controlling the amount of moisture needed in said soil between said first and second moisture detection probes to provide said discharge path from said gate junction of said transistor to ground;

wherein said electrically operated irrigation equipment is turned off by removing said positive conductive charge at said gate junction of said transistor, said positive conductive charge being discharged when said soil separating said first and second moisture detection probes is wet, thereby providing a discharge path from said gate junction of said transistor to ground.

3. For an irrigation system which includes an alternating current source and electrically operated irrigation equipment connected in series therewith, a control circuit for controlling the operation of said irrigation system based upon the moisture level of the ground in an area to be irrigated, comprising:

a first moisture detection probe positioned at an underground location in said area to be irrigated;

a second moisture detection probe positioned at a second underground location such that soil separates said first and second moisture detection probes, said second moisture detection probe connected to ground;

a transistor having a gate junction connected to said first moisture detection probe, a drain junction, and a source junction connected to ground, said electrically operated irrigation equipment being in an on condition when said gate junction of said transistor has a positive conductive charge;

a three junction, bi-stable semiconductor device, said first junction connected to said drain junction of said transistor, said second junction connected to said electrically operated irrigation equipment and said third junction connected to said electrical alternating current source and ground;

a first capacitor connected between said drain and gate junctions of said transistor, said first capacitor charging when said soil separating said first and second moisture detection probes is dry, said charge on said first capacitor providing a positive conductive charge at said gate junction of said transistor;

a first resistor connected between said drain junction of said transistor and ground, said first resistor partially controlling the amount of moisture needed in said soil between said first and second moisture detection probes to provide said discharge path from said gate junction of said transistor to ground; and means for protecting said control switch from pulsing current, said means for protecting further comprising:

a silicon controlled rectifier having an anode junction connected to ground, a cathode junction connected to the gate junction of said transistor and a gate junction connected to a terminal;

a second capacitor connected between said gate junction of said transistor and said terminal; and a third resistor connected between said anode junction of said silicon controlled rectifier and said terminal;

wherein said electrically operated irrigation equipment is turned off by removing said positive conductive charge at said gate junction of said transistor off, said positive conductive charge being discharged when said soil separating said first and second moisture detection probes is wet, thereby providing a discharge path from said gate junction of said transistor to ground.

4. For an irrigation system which includes an alternating current source and electrically operated irrigation equipment connected in series therewith, a control circuit for controlling the operation of said irrigation system based upon the moisture level of the ground in an area to be irrigated, comprising:

a first moisture detection probe positioned at an underground location in said area to be irrigated;

a second moisture detection probe positioned at a second underground location such that soil separated said first and second moisture detection probes, said second moisture detection probe connected to ground;

a transistor having a gate junction connected to said first moisture detection probe, a drain junction, and a source junction connected to ground, said electrically operated irrigation equipment being in an on condition when said gate junction of said transistor has a positive conductive charge;

a three junction, bi-stable semiconductor device, said first junction connected to said drain junction of said transistor, said second junction connected to said electrically operated irrigation equipment and said third junction connected to said electrical alternating current source and ground;

a first capacitor connected between said drain and gate junctions of said transistor, said first capacitor charging when said soil separating said first and second moisture detection probes is dry, said charge on said first capacitor providing a positive conductive charge at said gate junction of said transistor;

a first resistor connected between said drain junction of said transistor and ground, said first resistor partially controlling the amount of moisture needed in said soil between said first and second moisture detection probes to provide said discharge path from said gate junction of said transistor to ground; and means for protecting said control switch from pulsing current, said means for protecting further comprising:

a silicon controlled rectifier having an anode junction connected to ground, a cathode junction connected to the gate junction of said transistor and a gate junction connected to a terminal;

a second capacitor connected between said gate junction of said transistor and said terminal; and a third resistor connected between said anode junction of said silicon controlled rectifier and said terminal; and a rectifier diode connected between said terminal and said gate junction of said silicon controlled rectifier, said rectifier diode preventing chattering when moisture content of said soil between said first and second moisture detection probes is at the transition point between dry and wet detections;

wherein said electrically operated irrigation equipment is turned off by removing said positive conductive charge at said gate junction of said transistor off, said positive conductive charge being discharged when said soil separating said first and second moisture detection probes is wet, thereby providing a discharge path from said gate junction of said transistor to ground.

* * * * *